United States Patent

Iwasaki et al.

[11] Patent Number: 5,396,711
[45] Date of Patent: Mar. 14, 1995

[54] METHOD OF AND APPARATUS FOR MEASURING TOOTH THICKNESS OF GEAR

[75] Inventors: Hideo Iwasaki; Takahide Tokawa; Hirohisa Ichihata, all of Kyoto; Syun-ichi Nishizawa, Nagaokakyo, all of Japan

[73] Assignee: Mitsubishi Jukogyo Kabushiki Kaisha, Tokyo, Japan

[21] Appl. No.: 6,748

[22] Filed: Jan. 21, 1993

[30] Foreign Application Priority Data

Jan. 31, 1992 [JP] Japan .................. 4-016141

[51] Int. Cl.6 .................. G01M 13/02; G01B 21/20; G01B 5/20
[52] U.S. Cl. .................. 33/501.14; 33/501.15; 33/501.18
[58] Field of Search ............. 33/501.14, 501.7, 501.11, 33/501.15, 501.17, 501.18, 783, 784

[56] References Cited

U.S. PATENT DOCUMENTS

| | | | |
|---|---|---|---|
| 643,080 | 2/1900 | Boulet | 33/501.11 |
| 1,591,349 | 7/1926 | Wickman | 33/501.18 |
| 2,657,469 | 11/1953 | Brown | 33/501.14 |
| 2,749,624 | 6/1956 | McClure | 33/501.18 |
| 3,494,043 | 2/1970 | Höfler | 33/501.18 |
| 4,646,443 | 3/1987 | Höfler | 33/501.15 |
| 4,769,917 | 9/1988 | Bertz et al. | 33/501.7 |
| 4,962,590 | 10/1990 | Ambrose | 33/501.14 |

FOREIGN PATENT DOCUMENTS

| | | |
|---|---|---|
| 3150773 | 6/1983 | Germany . |
| 3224980 | 1/1984 | Germany . |
| 1-521281 | 11/1989 | Japan . |
| 3-605601 | 3/1991 | Japan . |

*Primary Examiner*—Christopher Fulton
*Attorney, Agent, or Firm*—McAulay Fisher Nissen Goldberg & Kiel

[57] ABSTRACT

A method of measuring tooth thickness in which the tooth thickness of gear is determined by bringing a pair of measuring legs having an opposing measuring part of ridge line shape close to each other in the direction perpendicular to the axis of gear being measured, letting said measuring parts abut on the tooth face, and measuring the gap between the pair of measuring parts, and an apparatus for carrying out this method.

2 Claims, 5 Drawing Sheets

FIG. I

METHOD OF AND APPARATUS FOR MEASURING TOOTH THICKNESS OF GEAR

FIELD OF THE INVENTION AND RELATED ART STATEMENT

This invention relates to a method of and apparatus for easily measuring tooth thickness of gear and, more particularly, the apparatus used by being mounted on a gear cutting machine.

A variety of methods of measuring tooth thickness have been known. One of them is shown in FIG. 6. With this method, a master gear 8 is meshed with a finished gear 4 being measured to determine the distance L between the axis of gear 4 and that of the master gear 8.

Another method is shown in FIG. 7. With this method, balls 9, whose diameter has been known, are inserted into the tooth spaces of teeth 4 to measure the dimension between the outer ends of balls 9. For a gear having an even number of teeth, the balls are inserted into the tooth spaces opposing to each other diametrically. For a gear having a odd number of teeth, the balls are inserted into the tooth spaces offsetting by the angle of $\pi/z$ radian (where, $\pi$ is the ratio of the circumference of a circle to its diameter, and z is the number of teeth) diametrically. This method is called an overpin method.

FIG. 8 shows still another method of measuring tooth thickness. With this method, the dimension is measured by putting a plurality of gear teeth between a pair of measuring legs 21 which constitute two planes in parallel to each other, and the tooth thickness is determined from the measurement result. This method is called a method of measuring a displacement over a given number of teeth at right angles to the tooth.

With the method of measuring the distance between the axes by meshing a master gear 8 with a gear 4 as shown in FIG. 8, when the principal dimensions of tooth differ, a master gear 8 which is suitable to that tooth is required; many master gears, which are expensive, must be manufactured and stored, thereby the cost being increased.

With the overpin method shown in FIG. 7, the balls 9 for measurement must be changed each time the module m or the diametral pitch DP of the teeth and the number of teeth z change. Therefore, time and labor are required for the preparation for measurement, and a device for changing balls is needed.

The method of measuring a displacement over a given number of teeth as shown in FIG. 8 has no disadvantage described above. However, this method has a disadvantage that the measuring leg 21 is inclined in accordance with the helix angle of tooth when measurement is made on a helical gear. Therefore, measurement cannot be made for a tooth 4 with a large helix angle and a small face width because the teeth cannot be put between measuring legs 21 as shown in FIG. 9.

OBJECT AND SUMMARY OF THE INVENTION

Accordingly, an object of the present invention is to enable the measurement of tooth thickness of helical gears with a large helix angle and a small face width without the problems described in the previous statement of related art.

With the measuring method in accordance with the present invention, the tooth thickness of the gear is determined by bringing a pair of measuring legs having an opposing measuring part of ridge line shape close to each other in the direction perpendicular to the axis of the gear being measured, letting the measuring parts abut on the tooth face, and measuring the gap between the pair of measuring parts.

The measuring apparatus in accordance with the present invention comprises a pair of measuring legs having a measuring part which is formed in a ridge line shape to be in contact with the tooth face of the gear and arranged in an opposing relation in parallel to each other, guide means for moving the measuring legs straight, drive means for moving the measuring legs in the direction in which the measuring legs move close to or away from each other, and a measuring means for measuring the gap between the measuring parts of the measuring legs.

A pair of measuring legs move close to or away from each other, and the measuring part abuts the tooth face of the gear. At this time, since the measuring part of the measuring leg is of a ridge line shape, the tooth thickness is measured along the direction perpendicular to the gear axis, and the displacement over a given number of teeth at right angles to the axis is measured with the measuring means. Then, the value measured by the measuring means is calculated and converted into the measured value obtained by the other methods.

DETAILED DESCRIPTION OF PREFERRED EMBODIMENTS

Figure 1:
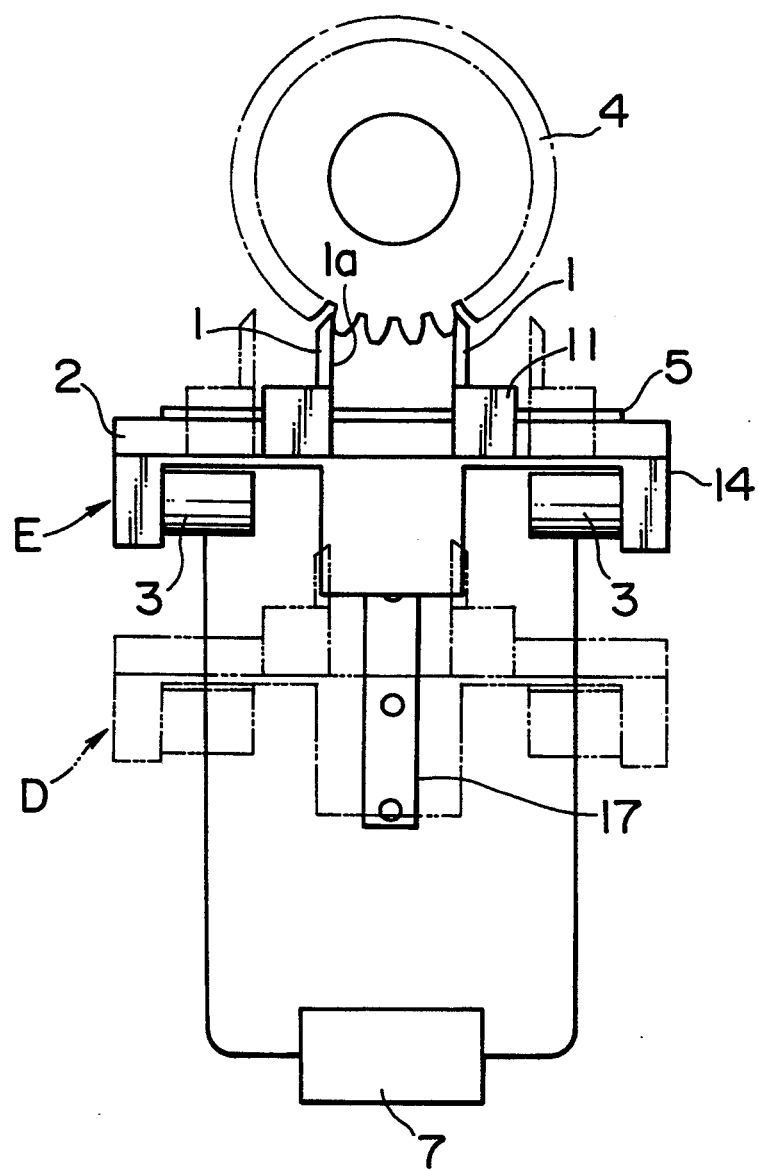
FIG. 1 is a schematic view of an apparatus for measuring tooth thickness in accordance with one embodiment of the present invention.
Figure 2:
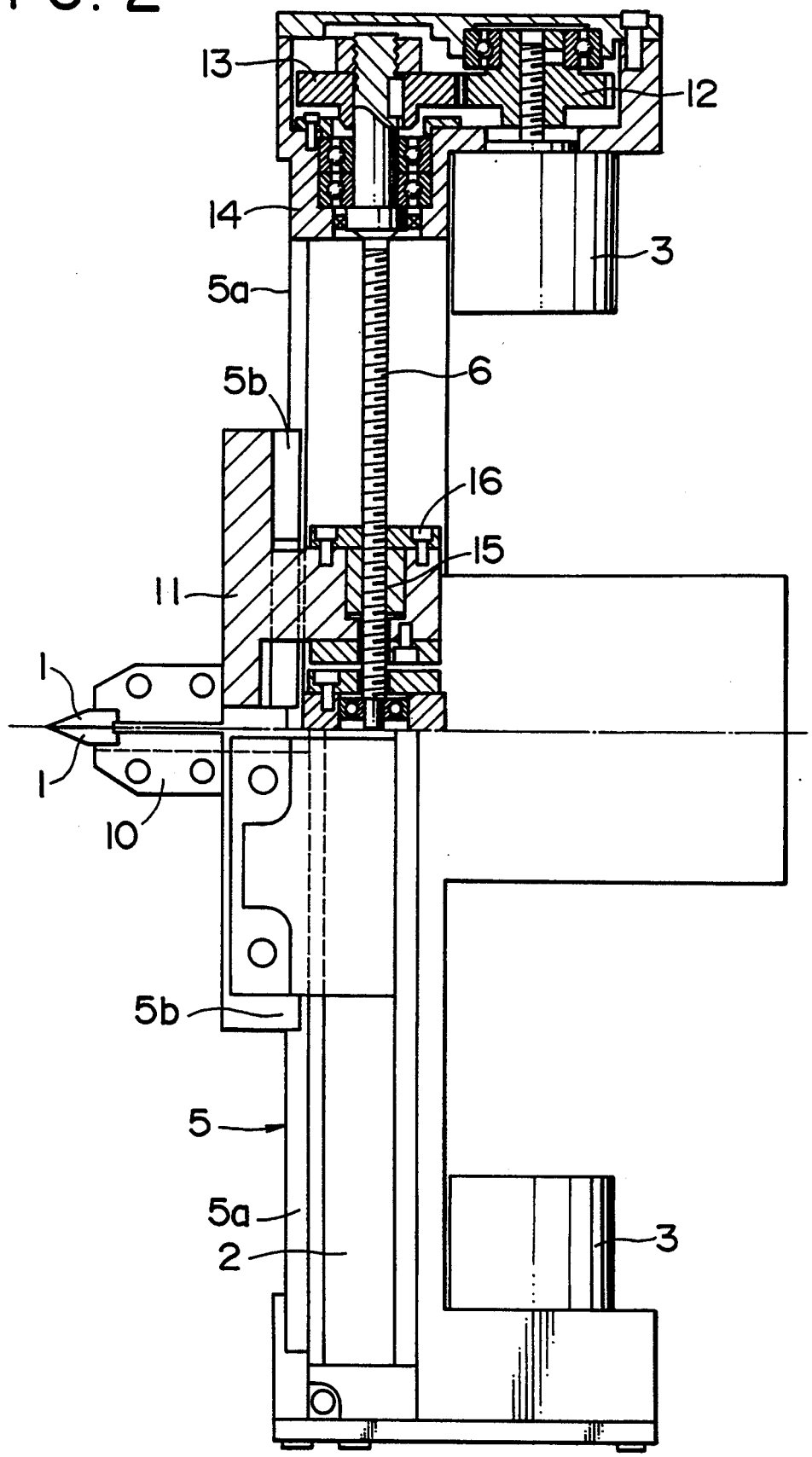
FIG. 2 is an expanded view of the main part of an apparatus for measuring tooth thickness shown in FIG. 1, the right half being a sectional view.
Figure 3:
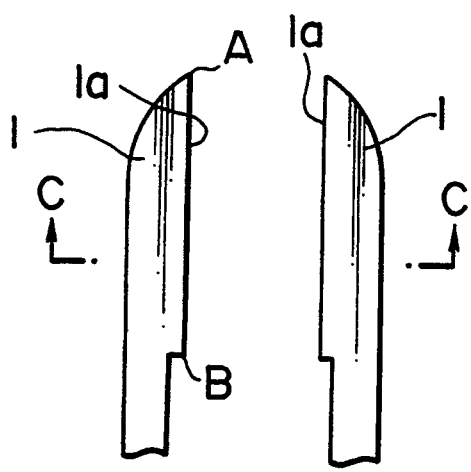
FIG. 3 is an expanded plan view of the measuring legs of an apparatus for measuring tooth thickness in accordance with one embodiment of the present invention.

One embodiment of apparatus for measuring tooth thickness in accordance with the present invention is shown in FIGS. 1 through 5. This embodiment will be described with reference to these figures.

As shown in FIGS. 1 through 4, a pair of measuring less 1 opposing to each other are fixedly mounted to sliders 10 so that measuring parts 1a having a ridge line shaped tip portion, which are brought into contact with a gear 4, are in parallel to each other. The slider 10 is fixed to a bracket 11 with not illustrated bolts.

A pair of linear guides 5 are installed horizontally on a frame 14, which constitutes the outer frame of this apparatus, to guide the straight movement of the bracket 11. The linear guide 5 comprises a linear rail 5a and a linear block 5b engaging movably with the linear rail 5a. The linear block 5b is connected to the slider 10 with not illustrated bolts.

A ball screw 6, which is a power transmitting means, is rotatably supported in parallel to the linear rail 5a by the frame 14. At one end of the ball screw 6, a gear 13 is installed. The gear 13 is meshed with a gear 12, which is installed to a driving means 3 consisting of a motor or the like, by which the ball screw 6 is connected to the driving means 3. The bracket 11 has a nut portion 15 which threadedly engages with the ball screw 6 and is fixed with bolts 16. Thus, the ball screw 6 is connected to the bracket 11 via the nut portion 15.

Not illustrated balls or bearings are disposed between the linear rail 5a and the linear block 5b and between the ball screw 6 and the nut portion 15 to smoothen the relative movement.

On the frame 14, a linear scale 2 is installed to the bracket 11 in parallel to the linear rail 5a to exactly measure the position of a pair of brackets 11, so that the gap between the measuring parts 1a of a pair of measuring legs 1 installed on the bracket 11 via a slider 10 can be measured.

Therefore, when the driving means 3 is rotated, the gear 12 turns, and in turn the gear 13 engaging with the gear 12 rotates, so that the ball screw 8 is rotated. As a result, the linear block 5b moves smoothly on the linear rail 5a, by which the slider 10 installed to the bracket 11 and the measuring leg 1 move integrally. The measuring leg 1 moves independently in the direction perpendicular to the rotating axis of the gear 4, and the gap between the measuring parts 1a of the measuring legs 1 is measured with the linear scale 2.

As shown in FIG. 1, the frame 14 is movably supported by a support 17, and a not illustrated shaft is provided to vertically move the frame 14 on the support 17.

Therefore, the frame 14 on which the measuring legs are installed can take position D, indicated by alternate long and two short dashes line in FIG. 1, and position E which is an ideal position for measuring tooth thickness.

A pair of drive means 3 are connected to a control means 7 which controls the operation of the drive means 3. The linear scale 2 is connected to a not illustrated arithmetic unit to perform arithmetic operation of the measured value and convert the measured value into the value to be obtained by another measuring method, thereby the converted value being outputted.

Next, the operation of this embodiment will be described.

After the frame 14 is moved to a position just in front of the gear 4 along the support 17, the drive means 3 is activated by the command signal sent from the control means 7 to the drive means 3, by which the ball screw 6 is rotated. As a result, a pair of linear blocks 5b move along the linear rail 5a. The bracket 11 and the measuring leg 1 move together with the linear block 5b, by which the gap between the measuring legs 1 is decreased. When the measuring part 1a of the measuring leg 1 is brought into contact with the tooth face of the gear 4, the measuring leg 1 stops at this position. In this state, the linear scale 2 measures the gap between the measuring parts 1a of the measuring legs 1 and outputs the measured value.

Figure 4:
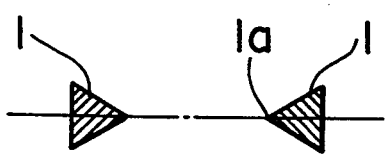
FIG. 4 is a sectional view taken along the line C—C of FIG. 3.
Figure 5:
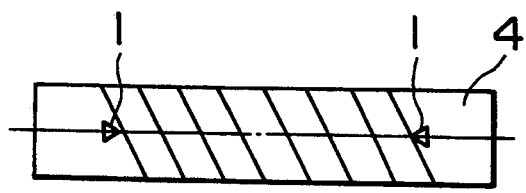
FIG. 5 is a view illustrating a state in which a tooth thickness is measured with an apparatus for measuring tooth thickness in accordance with one embodiment of the present invention.

The cross section of the measuring leg 1 is of a ridge line shape like a knife edge as shown in FIG. 4. Therefore, the straight portion between the end point A and the end point B of the measuring leg 1 shown in FIG. 3 always sweeps a path in a plane at right angles to the gear axis. For this reason, when both the measuring legs 1 are brought into contact with the tooth faces of the gear 4, the gap between the measuring parts 1a of the measuring legs 1 measured by the linear scale 2 is the displacement over a given number of teeth measured at right angles to the axis. This displacement over a given number of teeth can be converted into the measured value to be obtained by the method of measuring the displacement over a given number of teeth at right angles to the tooth or the overpin method by using the principal dimensions of gear by means of the arithmetic unit.

Although this embodiment uses a linear scale 2 as a measuring means, other publicly known measuring means may, needless to say, be used to obtain the same effect. Also, regarding the power transmitting means, any publicly known means other than the ball screw 6 may be used.

The apparatus for measuring tooth thickness of gear in accordance with the present invention offers the following effects as a result that the measuring part of the measuring leg is formed as a ridge line shape and the apparatus is constructed so that the measuring leg is moved straight in the direction in which the measuring leg comes close to or goes away from the gear.

Figure 6:
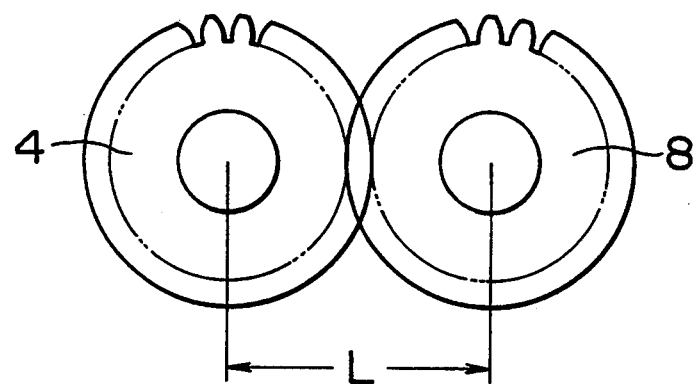
FIG. 6 is a view showing a method of measuring tooth thickness using the meshing with a master gear, which is one of the conventional methods.
Figure 7:
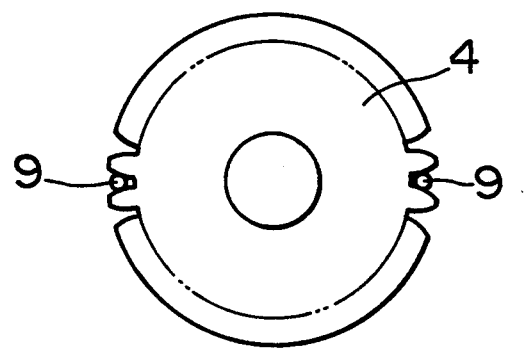
FIG. 7 is a view showing a method of measuring tooth thickness using the overpin method, which is one of the conventional methods.
Figure 8:
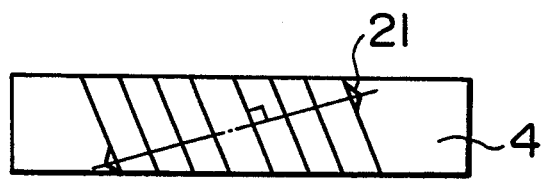
FIG. 8 is a view showing a method of measuring a displacement over a given number of teeth at right angles to the tooth.
Figure 9:
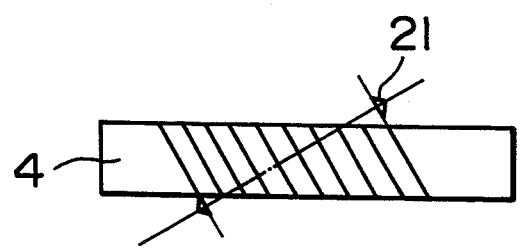
FIG. 9 is a view illustrating a case where measurement cannot be made by the method shown in FIG. 8.

Various gears with different principal dimensions can be measured with one measuring apparatus. The change of master gear shown in FIG. 6 or balls 9 for measurement shown in FIG. 7 is unnecessary, leading to the decrease in measurement time. The storage space for master gears 8 and the changing device for the master gear 8 or balls 9 are also unnecessary, leading to the reduction in cost. Measurement can be made on a gear 4 having a large helix angle and a small tooth width, thereby the versatility being improved as an apparatus for measuring tooth thickness.

By mounting the apparatus for measuring tooth thickness of the present invention on a gear cutting machine, the accuracy control of the gear being machined can be carried out. Therefore, the gear cutting accuracy can be enhanced by the feedback of the measurement result obtained by this apparatus to the gear cutting machine.

We claim:

1. A method of measuring tooth thickness of a helical gear comprising the steps of:

moving a pair of opposed knife-edge measuring legs, disposed parallel to each other, in a plane perpendicular to the axis of the helical gear to be measured, moving said measuring legs in a direction in which said opposed knife-edges move in alignment with each other and toward each other to bring said knife-edges respectively in line contact with the outboard facing tooth surfaces of a given plurality of teeth of the helical gear to be measured, and measuring the gap between the knife-edges of said measuring legs.

2. An apparatus for measuring tooth thickness of a helical gear comprising:

a pair of measuring legs having a pair of opposed knife-edges disposed parallel to each other, guide means for moving said knife-edge measuring legs in a plane perpendicular to the axis of the helical gear to be measured, separate drive means for independently moving each of said measuring legs in a direction in which said knife-edges move in alignment with each other and toward or away from each other, the movement of said guide means and drive means serving to locate the opposed knife-edges of said measuring legs respectively in line contact with the outboard facing tooth surfaces of a given plurality of teeth of the helical gear to be measured, and measuring means for measuring the gap between the knife-edges of said measuring legs.

* * * * *